July 14, 1931.   W. T. MORGAN   1,814,483
MEASURING AND MIXING MACHINE
Filed March 21, 1930   4 Sheets-Sheet 1
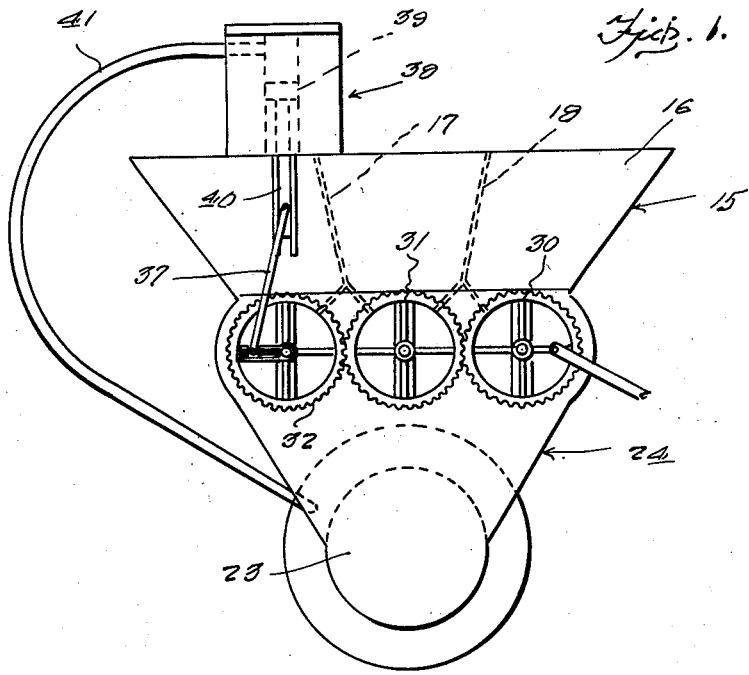
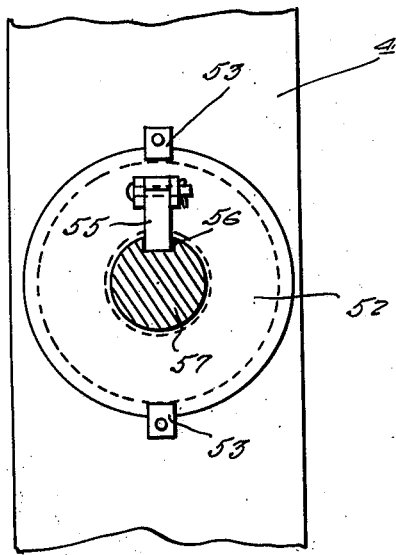
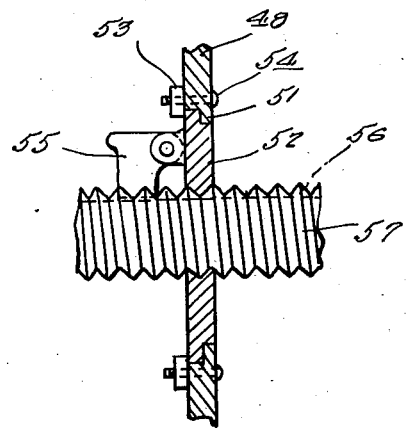
Inventor
W. T. Morgan
By Clarence A. O'Brien
Attorney

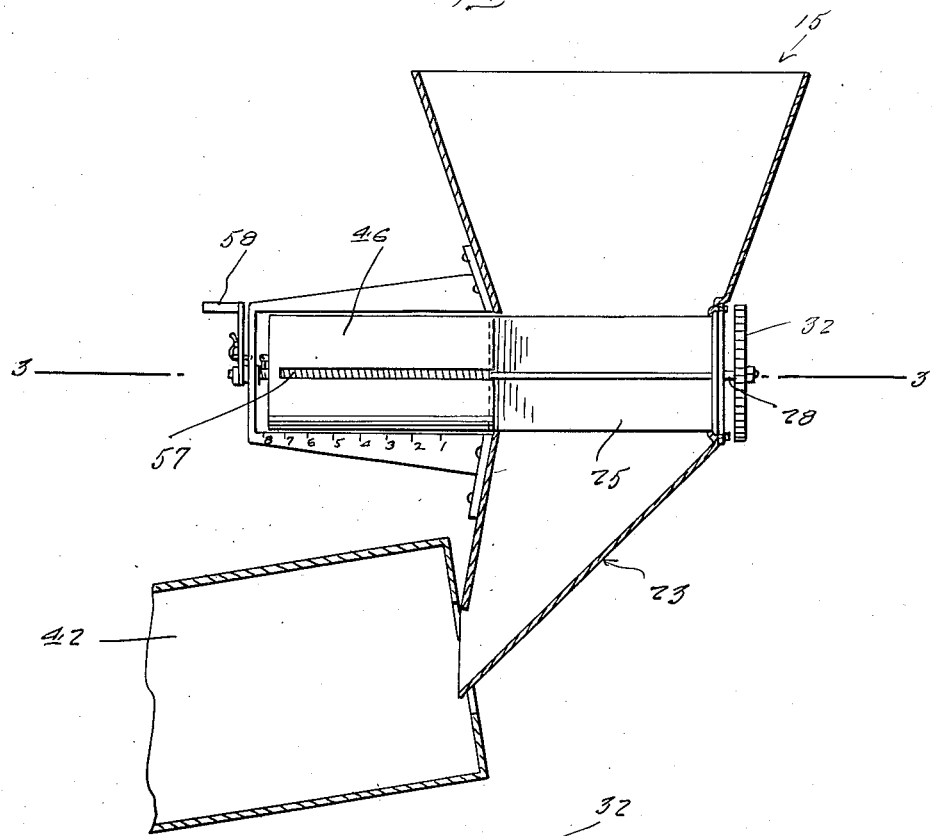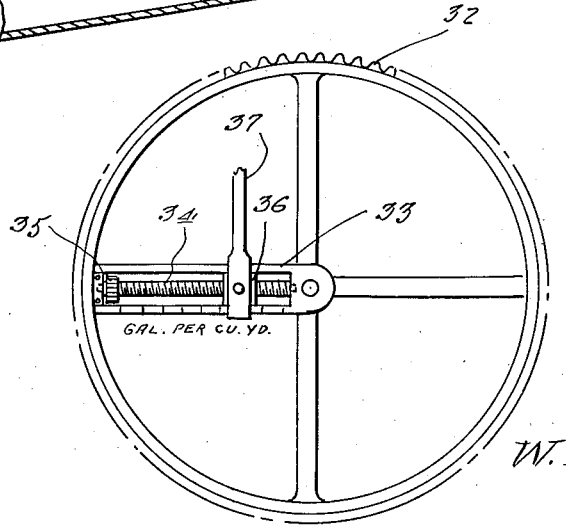

July 14, 1931. W. T. MORGAN 1,814,483
MEASURING AND MIXING MACHINE
Filed March 21, 1930 4 Sheets-Sheet 3
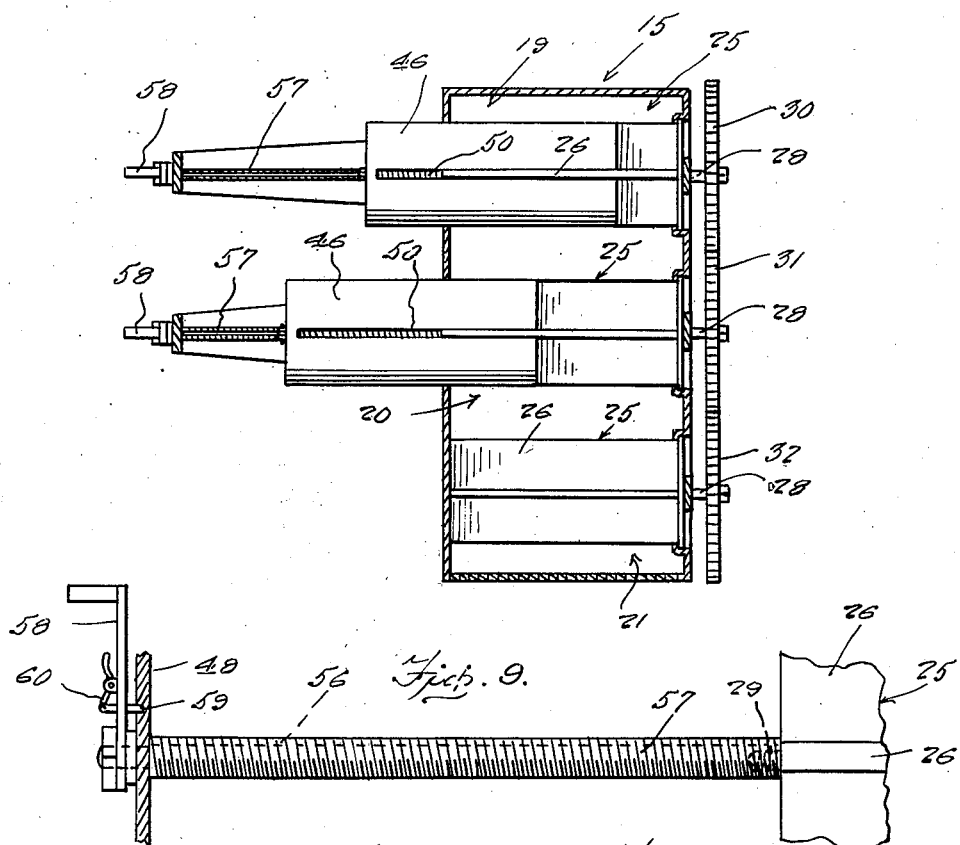
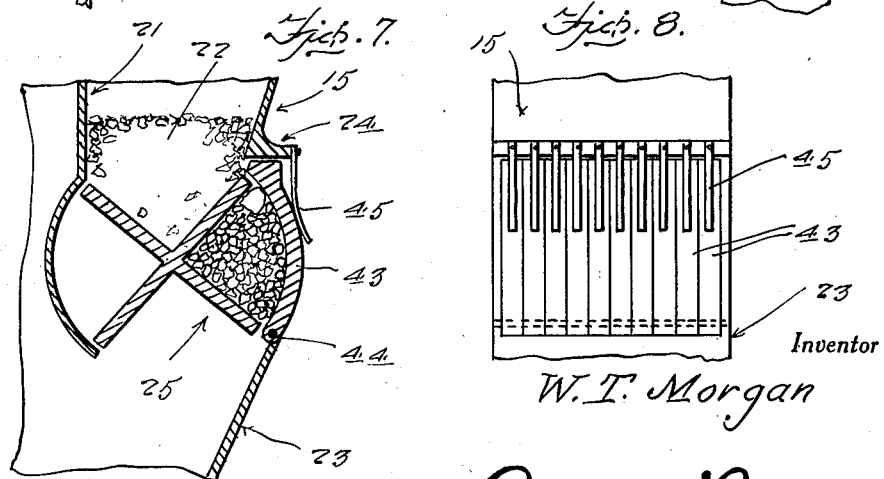
Inventor
W. T. Morgan
By Clarence A. O'Brien
Attorney

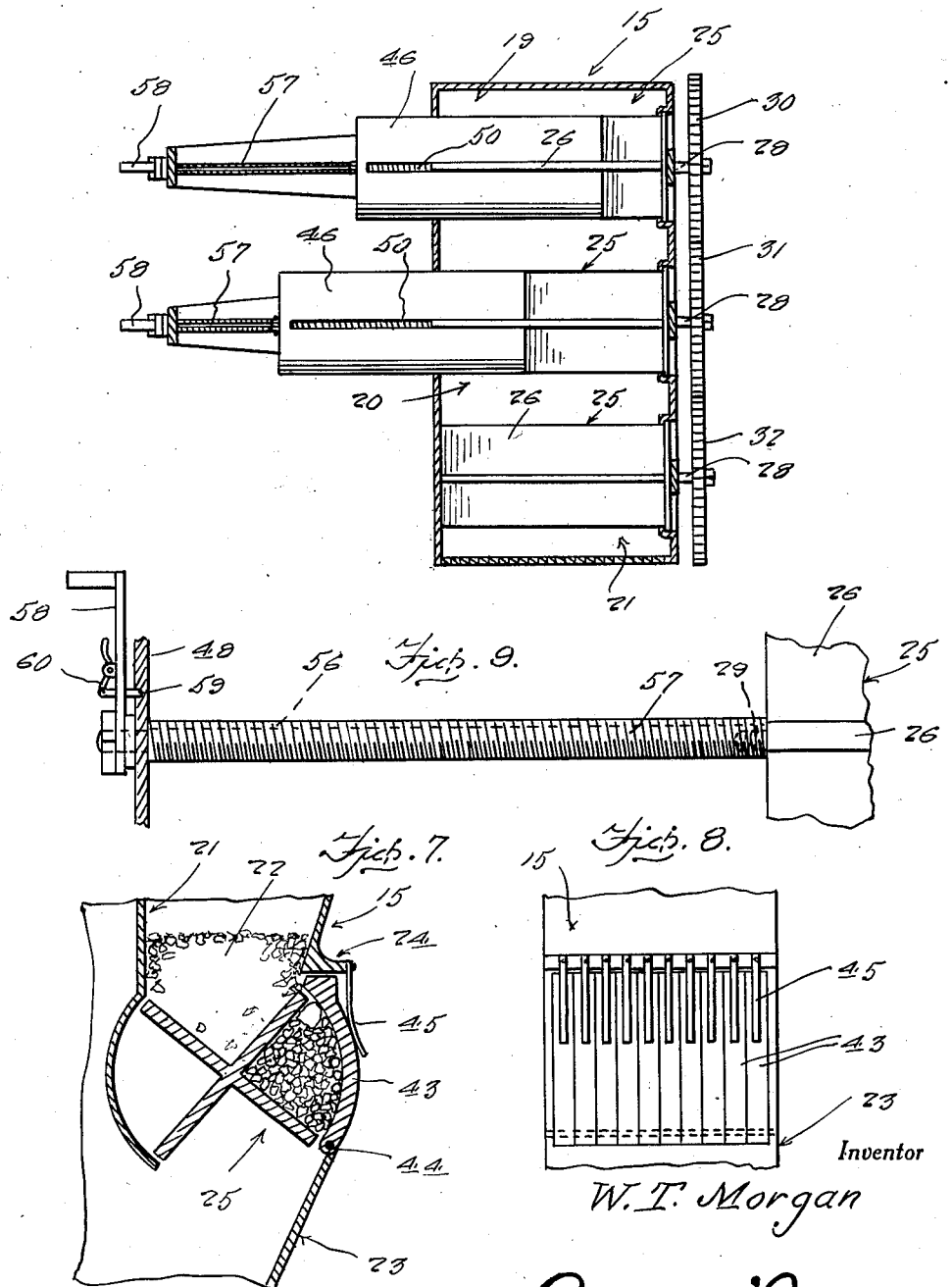

Patented July 14, 1931

1,814,483

UNITED STATES PATENT OFFICE

WILLIAM T. MORGAN, OF NEODESHA, KANSAS

MEASURING AND MIXING MACHINE

Application filed March 21, 1930. Serial No. 437,884.

This invention has reference to an improved material measuring and mixing machine which is susceptible of general utility in diversified trades and industry, but is more particularly designed for proportioning and intermixing different species of ingredients employed in the compounding of plastic building materials such as for example, concrete.

Broadly stated, the principal novelty is predicated upon an apparatus or machine of this classification which is characterized by a multiple compartment hopper for retaining the separate ingredients, said hopper embodying a discharge chute and a plurality of companion feeders for operation in unison, said feeders being mounted in the hopper construction in a manner to proportionately discharge the ingredients into the chute.

A further structural feature of the invention is founded upon the incorporation therein of a mechanically driven pump which is included in a water containing reservoir which is closely allied with the hopper construction and with the delivery pipe leading to the chute for discharging the proper amount of water into the aggregated mass falling into the chute, whereby to permit the composite product to be emptied into a rotating barrel or drum.

A notable structural feature of the machine is the novel arrangement in the feeder construction wherein one or more of these units includes a rotating and slidably mounted regulating sleeve functioning as a closing shield for cooperation with the pocket of the bladed rotary feeder so as to permit more accurate and precise proportioning of the ingredients.

Other features and advantages will become more readily apparent from the following description and drawings.

In the drawings:

Figure 1 is an end elevational view of the general assembly, showing the relative arrangement of details as developed in accordance with the present invention.

Figure 2 is a vertical sectional view through the structure seen in Figure 1.

Figure 3 is a horizontal section on the line 3—3 of Figure 2.

Figure 4 is an end view of a special adjusting screw and mounting means therefor.

Figure 5 is a fragmentary sectional view of the structure represented in Figure 4.

Figure 6 is an enlarged detail view showing the adjustable pitman drive for the water pump.

Figure 7 is a fragmentary sectional view showing an especially designed expansible wall arrangement in the hopper construction.

Figure 8 is a view observing the expansible wall structure seen in Figure 7 in a direction from right to left.

Figure 9 is a view showing the swivel mounting and actuating means for the rotary sleeve adjusting screw.

Figure 10 is an elevational view showing the assembly of one of the bladed feeders and its complemental regulating sleeve.

Figure 11 is an end view of the sleeve construction observing it in a direction from left to right.

Figure 12 is an end view of the opposite end of the sleeve, that is the right hand end in Figure 10.

Figure 13 is an end view of the head plate or disc of the feeder seen in Figure 10, observing the same in a direction from right to left.

Figure 14 is an end view observing the opposite end of the same feeder in a direction from left to right in Figure 10.

Attention is first invited to Figure 1, wherein it will be observed that the numeral 15 designates generally the material or ingredients containing hopper. The upper portion 16 is provided with horizontal partitions 17 and 18 dividing it into three distinct compartments represented in Figures 3 by the numerals 19, 20 and 21 respectively. These may be employed for containing cement, sand and gravel.

Incidently, the end compartment 21 is primarily intended to contain coarse gravel as at 22 in Figure 7. The lower end portion 23 of the hopper structure is made to define a chute 23 of the configuration better shown in Figure 2. This has a discharge opening at its bottom and an inclined bottom for facilitating gravitation of the mixed ingredients. The intermediate portion 24 in Figure 1 is designed to accommodate a series of three distinguishable rotary feeders.

Each feeder is the same in construction and a description of one will suffice for all. With this in mind I have employed the numerals 25 to designate generally each feeder and as seen in Figure 10 it comprises a plurality of radial blades 26 defining measuring pockets therebetween, these blades being connected at one end with a disc-like head 27 provided with a rotating axle 28. Incidently, as seen in Figure 14, the opposite end of the rotor is provided with a spindle or journal 29 which serves in a manner to be hereinafter described.

These feeders 25 are suitably mounted for rotation in the part 24 and are operated in synchronism through the medium of the intermeshing ring gears 30, 31 and 32 respectively as seen in Figure 1. The gear 30 is adapted to receive power from any suitable source (not shown).

The gear 32 as detailed in Figure 6 is of special construction in that it includes an elongated frame 33 in which an adjusting screw 34 is swivelly mounted. This screw is provided with a finger grip 35 and mounted thereon is a regulating nut 36 which is associated with the lower end of the pitman link 37. It will be noted in Figure 6 that the frame 33 has graduations to permit the nut 36 to be accurately adjusted.

In this connection, I might invite attention to the numeral 38 in Figure 1, which represents generally a tank or reservoir for containing water. Arranged therein is a suitable reciprocatory pump 39, the stem 40 of which operates in appropriate guides. The pitman rod 37 is operatively connected therewith as here shown. Thus the pump is operated in unison with the gearing and feeder so as to proportion the supply of water from the tank. Incidently, the numeral 41 designates a delivery pipe which extends from the pump down to and communicates with the receiver or chute 23. Thus as the various ingredients are fed into the receiver, a proportionate supply of water is delivered thereto for obvious mixing purposes.

So far as the description has gone, it will be seen that the hopper is so fashioned and designed as to provide independent compartments for separating the ingredients to be mixed. Each compartment has its separate rotary feeder. These various feeders are geared together through the medium of the gears 30, 31, and 32 so that they are turned in unison. Thus the materials are delivered into the hopper between the blades and then discharged into the receiver 23. From the discharge end of the receiver, the mixed materials flow or gravitate into the inclined container or drum 42 as shown in Figure 2.

It is obvious, of course, that the threaded ends of the stub axles or shafts 28 of the various feeders serve to accommodate the intermeshing ring gears. It is further evident that the leverage of the pump is adjusted through the medium of the hand regulated pitman mechanism already described. Accordingly, the amount of water may be precisely determined and regulated according to the relative proportion of ingredients discharged into the receiver 23.

It is important to note, as is represented in Figures 7 and 8, that the compartment 21 is primarily intended to contain the large granular material, for instance gravel. To prevent clogging and breakage of the rotary bladed feeder, I have formed the end wall which co-operates with the blades in a plurality of sections 43. These are arranged in edge-to-edge relation and are pivotally or hingedly mounted in the structure as at 44.

The upper ends are held in place through the medium of flat retention springs 45. This affords the desired individuality of expansion and contraction of the various sections to allow passage of unusually large particles of gravels. As before implied, this prevents breakage and clogging of this particular feeder. This is a distinctive feature in the invention.

In the compartments 19 and 20, I prefer to provide means for regulating the ingredients proportionately to the gravel. There is no regulating means for the gravel. The regulating means in the compartments 19 and 20 is the same in construction in each instance and a description of one will suffice for both.

To begin with, I have found it expedient and practical to utilize a cylindrical sleeve 46 for the purpose. This is rotatable and slidable. The closed end as seen in Figure 12 is formed with radial slits 47 to accommodate the blades of the companion feeder 25, as shown in Figure 10. The opposite end is formed with a spider 48 carrying an adjusting nut 49 which is fixedly arranged in place.

In addition, I form circumferentially spaced longitudinal slots or keyways 50 in the surface of the sleeve thus permitting the sleeve to be moved in and out with respect to the blades of the feeder. In fact, the blades extend through the radial slots 47 into the slots 50. This arrangement causes the sleeve to rotate continuously with the feeder and at the same time permits relative adjustment for regulating the length of the receiving pocket between the blades 26, as shown for example in Figure 3.

At this time, attention is called to Figures 4 and 5, wherein it will be seen that the spider 48 has a central hole formed therein and this hole is provided with circular flange 51 functioning as a shoulder. There is a disk 52 fitted into this opening and the disc also has a marginal flange abutting the flange 51.

The nuts 53 on the bolts 54 serve to fasten the disc to the spider. At the same time, this provides for the desired relative rotation of the spider with respect to the disc. In fact, the disc has a bracket provided with a pivoted pawl 55 and this is releasably positioned in a longitudinal channel or groove 56 formed in the adjusting screw 57. The adjusting screw is of course threaded through a screw threaded hole in the center of the disc 52.

As represented in Figure 9, one end of the screw is swivelled on the aforesaid journal 29 (see Figure 14). The opposite reduced nut equipped end of the screw is swivelled in a bearing hole in the spider. At this end of the screw is an operating crank handle 58 which is fastened on the screw for turning it. Incidently, the numeral 59 designates a retaining latch for the crank handle and this latch is fitted in a keeper socket in the spider. The numeral 60 represents a pivotally mounted finger piece for actuating the latch.

With this arrangement it is obvious that the screw 57 is retained in a stationary state through the medium of the latch 59 carried by the crank handle 58. The sleeve 48 is however rotatable around the ring or disc 52, the disc as seen in Figure 5 being held on the screw through the medium of the pawl 55. In fact, the pawl functions as a key and is slidable in the groove or keyway 56 in the screw. Thus, the ring 52 constitutes a bearing for the left hand end of the sleeve. The opposite end of the sleeve being fastened to the blade on the feeder, it is obvious that the sleeve turns with the feeder. When it is desired to adjust the sleeve however, the latch 59 is released, and the crank handle 58 is turned. This turns the feeding screw 57. The pawl 55 is also released at this moment and by turning the screw, the sleeve may be slid in or out as desired for regulating the length of the pockets.

In order that the various features of novelty in this machine may be emphasized, I wish to call attention at this time to the following factors. It is important in this arrangement to provide a multiple compartment hopper for containing the individual ingredients, to have a single receiver, and to interpose therebetween the bladed feeders and to connect the feeders together through the medium of oppropriate gearing so that they may be operated in unison and in appropriate timed relationship.

It is desirable too, to incorporate in the arrangement the pump-equipped water reservoir and to connect the pump with the gearing through adjustable means so that the amount of water may be regulated with respect to the relatively dry materials fed from the hopper. In this way, the compounded mass of material is proportioned properly and accurately.

Another feature to be emphasized is the adjustable sleeve arrangement for regulating the pockets, particularly wherein this includes a sleeve construction which has its bearing on the adjusting screw, and wherein the adjusting screw is so fashioned as to permit continuous rotation of the sleeve with the bladed feeder and to permit relative sliding motion thereof to the screw and feeder for adjusting purposes.

Then too, the sectional wall construction for the gravel compartment and the spring pressed retaining means for preventing clogging is a practical point.

As previously implied, it is understood that this invention is not to be restricted for measuring and mixing concrete. It is susceptible of diversified use in the various industries in the trade and may when constructed on a miniature scale, be employed for mixing ingredients of medicine, or may be employed for mixing dough, etc.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a mixing and proportioning machine of the class described, a hopper provided with partitions dividing it into individual compartments and including a receiver chute, a plurality of bladed pocket forming feeders mounted for rotation in the hopper and in alinement with the discharge end of said compartment, a plurality of intermeshing gears connecting said feeders together for operation in unison, a water tank, associated with the hopper and including a pump, a delivery pipe leading from the pump to said chute, an eccentric pitman connected with the pump piston, and an adjustable connection between said pitman and one of said gears, whereby to permit the water to be proportioned with respect to the delivery of the various ingredients into said receiver chute.

2. In a mixing and proportioning machine of the class described, a hopper, a bladed feeder mounted for rotation therein, operating means for said feeder, an adjusting sleeve closed at one end, said closed end having radial slits receiving the blades of the feeder, the surface portion of said sleeve having circumferentially spaced longitudinal slots receiving the edge portions of said blades, a normally fixed adjusting screw, operating means for said adjusting screw and a combined bearing and adjusting connection between the sleeve and screw, comprising an annulus having swivel connection with the sleeve, and releasable key connections with the screw.

3. In a structure of the class described, a hopper, a bladed feeder mounted for rotation therein, a slotted regulating sleeve cooperable with the blades and rotatable and slidable, a normally fixed adjusting screw, operating means for said screw, retaining means for said operating means, said sleeve including a spider at one end having a flanged opening, and a flanged annulus fitting into said opening and constituting a bearing for the spider, said annulus having a screw threaded hole through which said screw is threaded, said screw having a longitudinal keyway and a pivoted pawl on said annulus normally receivable in said keyway.

In testimony whereof I affix my signature.

WILLIAM T. MORGAN.